United States Patent [19]

McConnell et al.

[11] 4,217,426

[45] * Aug. 12, 1980

[54] POLYESTER/LOW-VISCOSITY POLYETHYLENE MELT BLENDS FOR POWDER ADHESIVES OR POWDER COATING MATERIALS

[75] Inventors: Richard L. McConnell, Kingsport; Doyle A. Weemes, Greeneville, both of Tex.

[73] Assignee: Eastman Kodak Company, Rochester, N.Y.

[ * ] Notice: The portion of the term of this patent subsequent to May 22, 1996, has been disclaimed.

[21] Appl. No.: 4,951

[22] Filed: Jan. 19, 1979

Related U.S. Application Data

[63] Continuation-in-part of Ser. No. 851,320, Nov. 14, 1977, Pat. No. 4,155,952.

[51] Int. Cl.² ............................................. C08L 67/06
[52] U.S. Cl. ............................. 525/173; 264/178 R; 525/174; 525/177
[58] Field of Search ................... 260/873; 264/178 R; 525/173, 174, 177

[56] References Cited

U.S. PATENT DOCUMENTS

| | | | |
|---|---|---|---|
| 3,361,848 | 1/1968 | Siggel | 260/873 |
| 3,405,198 | 10/1968 | Rein | 260/873 |
| 3,579,609 | 5/1971 | Sevenich | 260/873 |
| 3,657,389 | 4/1972 | Caldwell | 260/873 |
| 3,900,549 | 8/1975 | Yamane | 260/873 |
| 3,944,699 | 3/1976 | Fraser | 260/873 |
| 4,046,837 | 9/1977 | Carroll | 260/873 |
| 4,110,411 | 8/1978 | Imanaka | 260/873 |
| 4,155,952 | 5/1979 | McConnell | 260/873 |

*Primary Examiner*—Paul Lieberman
*Attorney, Agent, or Firm*—Malcolm G. Dunn; Daniel B. Reece, III

[57] ABSTRACT

Semi-crystalline polyester/low viscosity polyethylene melt blends, which are non-tacky and non-blocking and are more readily grindable by cryogenic grinding techniques, for providing powders suitable for powder adhesives particularly useful for fusible interlinings or for providing powder coating materials.

8 Claims, No Drawings

POLYESTER/LOW-VISCOSITY POLYETHYLENE MELT BLENDS FOR POWDER ADHESIVES OR POWDER COATING MATERIALS

This is a continuation-in-part application of Ser. No. 851,320 filed Nov. 14, 1977, now U.S. Pat. No. 4,155,952.

BACKGROUND OF THE INVENTION

The present invention is directed to semi-crystalline polyester/low viscosity polyethylene melt blends, which are more readily grindable by cryogenic grinding techniques to provide powders that are suitable for powder adhesives or powder coating materials, the powder adhesives being particularly suitable for fusible interlinings.

Certain semi-crystalline polyesters are useful as fusible interlining adhesives and as powder coating materials. Cryogenic grinding of the polyesters into powder and subsequent powder classification is relatively expensive because of the difficulty in grinding them into powders.

A fusible interlining is a fabric which has been coated on one side with a discontinuous pattern of fusible adhesive. When the interlining is bonded to a base fabric in a garment, it provides body and shape to the garment without impairing the ability of the fabric to breathe. Fusible interlinings are used in the manufacture of men's and women's suits, in shirt collars and cuffs, and in the waistbands of trousers.

Certain polyamide terpolymers are currently being used as fusible interlining adhesives. The polymers used are generally terpolymers containing nylon 6, 66, and nylon 10, 11, or 12 units in the terpolymer. These polymers generally melt at about 100° C. and are used in the form of fine powders. Although used commercially, these polyamide powders have certain deficiencies. For example, polyamides absorb large amounts of moisture and they block in the presence of high relative humidity conditions. Therefore, they must be stored in polyethylene-lined bags prior to being used.

Polyamides also have inadequate bond strength on rainwear fabrics, and they tend to strike through on dark fabrics, giving them an undesirable appearance.

Certain copolyesters are potentially useful for fusible interlining applications which do have adequate bond strength on rainwear fabrics and which do not tend to strike through on dark fabrics, but powdering of these copolyesters by cryogenic grinding techniques is relatively expensive.

It has now been found that melt blending of small amounts of low-viscosity polyethylenes with these polyesters or copolyesters results in substantially improved grinding rates and, therefore, substantially decreases the cost of manufacturing powder. These melt blends were found to provide non-tacky and non-blocking blends, readily reduced to powder by cryogenic grinding techniques. The yields of powder were also found to be substantially higher than those obtained when grinding the non-blended polyester or copolyester.

Such low viscosity polyethylenes useful in the practice of this invention include both low- and high-density polyethylene materials. Such polyethylenes may also be unmodified or chemically modified by oxidation or grafting.

Polyesters or copolyesters useful in this invention include materials having melting points in the range of about 80°–175° C. with inherent viscosities of about 0.4 to 1.2.

An object of the invention, therefore, is to provide polyester/low- and high-density polyethylene melt blends which are more readily grindable by cryogenic grinding techniques for providing powders which are useful as adhesives or powder coating materials.

SUMMARY OF THE INVENTION

The invention is directed to semi-crystalline polyester/low viscosity polyethylene melt blends, which comprise an intimate melt blend of a semicrystalline polyester having an inherent viscosity ranging from about 0.4 to 1.2, a melting point of about 80°–175° C. and an apparent heat of fusion ($\Delta H_f$) of $\leq 10$ calories per gram, and a low molecular weight polyethylene having a melt viscosity ranging from about 50 to 30,000 centipoises at 150° C., a density at 25° C. of about 0.90 to 0.98, and an acid number of about 0–80. The low molecular weight polyethylene is present in the blend in concentrations ranging from about 3 to about 30% by weight, with preferred concentrations being about 5 to 15 weight percent.

The "apparent heat of fusion" ($\Delta H_f$) of polymers is the amount of heat absorbed when crystallizable polymers are melted. $\Delta H_f$ values are readily obtained using thermal analysis instruments such as the Perkin-Elmer DSC-2 Differential Scanning Calorimeter or the Du Pont Model 990 Thermal Analyzer with differential scanning calorimeter cell. One method for determining $\Delta H_f$ is described in the *Journal of Applied Polymer Science*, 20, 1209 (1976). Measurement of $\Delta H_f$ is also described in Du Pont Thermal Analysis Bulletin No. 900-8 (1965). Qualitatively, it is possible to compare the degree of crystallinity of polymers by comparing their $\Delta H_f$ values.

It has been found that $\Delta H_f$ is an important property which has a significant effect on grindability. When $\Delta H_f$ exceeds about 10 calories per gram, the grindability of the polymer is adversely affected.

As mentioned above, the polyesters involved are of semicrystalline nature, having apparent heats of fusion values of equal to or less than 10 calories per gram. The polyethylene involved is of low viscosity, i.e., of low molecular weight, and as such may be of low or high density.

The percentage of polyethylene melt blended with the semicrystalline polyester does not affect the adhesive funtion of the polyester, but does serve to render the polyester non-blocking and non-tacky and to facilitate grinding of the polyester from pellets or like form into powder materials. The mechanism by which such improved grindability is obtained is not understood. It is theorized, however, that the polyethylene, which is substantially non-compatible with the polyester, forms sites along which cleavage planes may be formed in the pellet, thus enabling easier grinding of the pellet into powder.

More specifically, the polyester polymer may be derived from about 80–60 mole percent terephthalic acid, 20–40 mole percent adipic acid, 80–60 mole percent ethylene glycol and 20–40 mole percent, 1,4-butanediol; and perferably the polyester polymer may be derived from about 70 mole percent terephthalic acid, 30 mole percent adipic acid, 73 mole percent ethylene glycol, and 27 mole percent 1,4-butanediol.

The polyester polymer may also be derived from 10-35 mole percent isophthalic acid, 90-65 mole percent terephthalic acid and 100 mole percent 1,6-hexanediol with preferred embodiments being derived from 10 mole percent isophthalic acid, 90 mole percent terephthalic acid, and 100 mole percent 1,6-hexanediol having a melting point of about 140° C. and an apparent heat of fusion of about 8 calories per gram; 20 mole percent isophthalic acid, 80 mole percent terephthalic acid and 100 mole percent 1,6-hexanediol having a melting point of about 125° C. and an apparent heat of fusion of about 5 calories per gram; and 35 mole percent isophthalic acid, 65 mole percent terephthalic acid and 100 mole percent 1,6-hexanediol having a melting point of about 140° C. and an apparent heat of fusion of about 2 calories per gram.

The polyester may further be derived from 40-60 mole percent isophthalic acid, 60-40 mole percent terephthalic acid and 100 mole percent 1,4-butanediol with preferred embodiments being derived from 40 mole percent isophthalic acid, 60 mole percent terephthalic acid and 100 mole percent 1,4-butanediol having a melting point of about 140° C.; 50 mole percent isophthalic acid, 50 mole percent terephthalic acid and 100 mole percent 1,4-butanediol having a melting point of about 129° C. and an apparent heat of fusion of about 2 calories per gram; and 60 mole percent isophthalic acid, 40 mole percent terephthalic acid and 100 mole percent 1,4-butanediol having a melting point of about 140° C.

The polyester polymer may still further be derived from 70-50 mole percent isophthalic acid, 30-50 mole percent terephthalic acid, and 100 mole percent 1,4-cyclohexanedimethanol, with a preferred embodiment being derived from 60 mole percent isophthalic acid, 40 mole percent terephthalic acid, and 100 mole percent 1,4-cyclohexanedimethanol. These polyesters are substantially amorphous, having apparent heats of fusion of about 1-4 calories per gram. In the preferred embodiment, the apparent heat of fusion is about 1 calorie per gram, and it has a weak melting endotherm at 175° C.

The polyester polymer may also still further be derived from 100-60 mole percent terephthalic acid, 0-40 mole percent isophthalic acid, 100-35 mole percent 1,6-hexanediol and 0-65 mole percent 1,4-butanediol; and preferably 100-65 mole percent terephthalic acid, 0-35 mole percent isophthalic acid, 95-40 mole percent 1,6-hexanediol and 5-60 mole percent 1,4-butanediol. These polyesters generally show a melting point ranging from about 80° to about 155° C.

The process by which the improved polyester powder adhesive described above may be produced involves melt blending particulate or pelleted material selected from a semicrystalline polyester having an inherent viscosity ranging from about 0.4 to 1.2, a melting point of about 80°-175° C. and an apparent heat of fusion of $\leq 10$, and a low molecular weight polyethylene having a melt viscosity ranging from about 50 to 30,000 centipoises at 150° C., a melting point of about 90°-135° C., a density at 25° C. of about 0.90 to 0.98, and an acid number of about 0-80. The low molecular weight polyethylene present in the melt blend is in concentrations ranging from about 3 to about 30% by weight. The blended materials are melt extruded at a temperature of about 150°-250° C. into a cooling medium to form a predetermined extruded shape, which is chopped into pellets or otherwise granulated. Then the pellets or granulated materials are ground under cryogenic temperature conditions into a powder. The semicrystalline polyester and low molecular weight polyethylene may be selected from the materials described above in the description of the product.

The "cooling medium" mentioned in the preceding paragraph is generally water having a temperature of about 5° C. to about 50° C.

The melt-extruded pellets or granulated material may also, in some cases, prior to the step of grinding, be heat treated in hot water at a temperature of about 60°-100° C. for about 10 minutes to 3 hours, then dried at a temperature of about 30°-80° C. for a time sufficient to remove the moisture. This heat treatment tends to increase slightly the degree of crystallinity of the pellets or granulated material.

DESCRIPTION OF THE PREFERRED EMBODIMENT

The blends discussed above in the "Summary of the Invention" are readily prepared by melt blending in extruders, Brabender Plastographs, Banbury mixers, and the like. The blends are readily ground in conventional hammer mills or pin mills using liquid nitrogen to cool them. High yields of powder are achieved with very low nitrogen usage. For example, the amount of nitrogen required may be as low as about one pound of liquid nitrogen per pound of powdered product.

Powders for powder coating applications are generally less than 70 mesh or less than 140 mesh materials.

Powders used for fusible interlining applications are generally applied from powder point applicators, from random sprinkling equipment, or in the form of a paste. The particle size required for each of these three types of applications, however, is generally quite critical. For example, in the application of powders from the powder point applicators, it is desirable to have powders with a particle size range of 50-200 microns (270-70 mesh). For random sprinkling application on tightly woven or nonwoven fabrics, a particle size range of 150-300 micron (100-50 mesh) is desirable. For random sprinkling on an open weave fabric such as inexpensive rayon/cotton blends, powders with 300-500 micron size (50-35 mesh) are required. For application of powder in paste form, it is necessary to have very fine powders. For example, in paste form, powder size should be 0-80 micron (less than 200 U.S. mesh).

"I.V." as used herein means "inherent viscosity", which is determined using a polymer concentration of 0.5% of the solvent (60% by weight phenol and 40% by weight tetrachloroethane). The polymer is dissolved in the solvent at a temperature of 125° C. and I.V. is measured at a temperature of 25° C.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Pellets of poly(ethylene terephthalate) polyester modified with 30 mole percent adipic acid and 27 mole percent 1,4-butanediol (90 g.; I.V. [inherent viscosity] 0.73, $T_m$ [melting point] 127° C.; $\Delta H_f$ 4 calories per gram) and oxidized, low-viscosity, high-density polyethylene (10 g.; acid No. 16; melt viscosity 160 cp. [centipoises] at 150° C.) are physically blended and extended at 205° C. and 150 rpm into 23° C. water and chopped into ¼-inch pellets. These pellets (10 g.) are cryogenically ground in a micromill and sieved through a 70 mesh screen. The blend has a grindability rating of 28.6% (percentage of powder which will pass through a 70 mesh screen) as compared to 10% for the polyester without the blended polyethylene. The grindability rating of the blend is further improved by heat treating the pellets in boiling water for two hours. After drying the pellets in a vacuum over for 16 hours at 60° C., the pellets have a grindability rating of 43%.

The cryogenically ground blend powder (<70 mesh) is applied to fusible interlining fabric by a random sprinkling technique and fused under an ultraviolet lamp to provide a coating weight of 15 g./yd.$^2$. Samples of the fusible interlining are bonded to polyester doubleknit fabric at 152° C./4.5 psi/15 second dwell time. The peel strength of the bond is 1.5 pounds/inch.

Similarly good results are obtained when the <70 mesh powder is applied to fusible interlining fabric from a powder point coater and the dots of adhesive are fused by passing the fabric under a bank of quartz infrared heaters.

EXAMPLE 2

Pellets of poly(ethylene terephthalate) polyester modified with 30 mole percent adipic acid and 27 mole perent 1,4-butanediol (90 g.; I.V. [inherent viscosity] 0.73; $T_m$ [melting point] 127° C.; $\Delta H_f$ 4 calories per gram) and low-viscosity, high-density polyethylene (10 g.; melt viscosity 450 cp. at 125° C.) are physically blended and extruded at 205° C. and 150 rpm into 23° C. water and chopped into ¼-inch pellets. The grindability procedure of Example 1 is repeated and the resulting blend has a grindability rating of 17.5% as compared to 10% for the polyester without the blended polyethylene.

EXAMPLE 3

Pellets of poly(ethylene terephthalate) polyester modified with 30 mole percent adipic acid and 27 mole percent 1,4-butanediol (90 g.; I.V. [inherent viscosity] 0.73; $T_m$ [melting point] 127° C.; $\Delta H_f$ 4 calories per gram) and oxidized low-viscosity, low-density polyethylene (10 g.; acid No. 15; melt viscosity 1200 cp. at 125° C.) are physically blended and extruded at 205° C. and 150 rpm into 23° C. water and chopped into ¼-inch pellets. The grindability procedure of Example 1 is repeated and the resulting blend has a grindability rating of 34% as compared to 10% for the polyester without the blended polyethylene.

Similar improvements in grindability are achieved when 3%, 5%, and 20% concentrations of the polyethylene are melt blended with the modified polyester.

Samples of <70 mesh powder obtained from the 90/10 polyester/polyethylene blend are coated with 0.35% Cab-O-Sil (a fumed silica). This powder is applied to fusible interlining fabric using a powder point applicator with heated roll at 400° F., engraved roll at 125° F., fusion temperature in the sintering oven controlled with Variac setting of 160 and roll speed of 12 rpm. Fusible interlining samples having a coating weight of 18 g./yd.$^2$ are bonded to polyester/wool worsted fabric at 150° C./4.5 psi/15 second dwell time and the bonded samples have a peel strength of 1.2 pounds/inch.

EXAMPLE 4

Pellets of poly(ethylene terephthalate) polyester modified with 30 mole percent adipic acid and 27 mole percent 1,4-butanediol (90 g.; I.V. [inherent viscosity] 0.73; $T_m$ [melting point] 127° C.; $\Delta H_f$ 4 calories per gram) and low-viscosity, low-density polyethylene (10 g.; melt viscosity 1800 cp. at 125° C.) are physically blended and extruded at 205° C. and 150 rpm into 23° C. water and chopped into ¼-inch pellets. The grindability procedure of Example 1 is repeated and the modified polyester/polyethylene blend has a grindability rating of 24% as compared to 10% for the polyester without the blended polyethylene.

EXAMPLE 5

Pellets of poly(ethylene terephthalate) polyester modified with 30 mole percent adipic acid and 27 mole percent 1,4-butanediol (90 g.; I.V. [inherent viscosity] 0.73; $T_m$ [melting point] 127° C.; $\Delta H_f$ 4 calories per gram) and maleated, low-viscosity, low-density polyethylene (10 g.; saponification No. 5; melt viscosity 12,000 cp. at 150° C.) are physically blended and extruded at 205° C. and 150 rpm into 23° C. water and chopped into ¼-inch pellets. The grindability procedure of Example 1 is repeated and the resulting blend has a grindability rating of 23% as compared to 10% for the polyester without the blended polyethylene.

EXAMPLE 6

Pellets of poly(ethylene terephthalate) polyester modified with 30 mole percent adipic acid and 27 mole percent 1,4-butanediol (90 g.; I.V. [inherent viscosity] 0.73; $T_m$ [melting point] 127° C.; $\Delta H_f$ 4 calories per gram) and low-viscosity, low-density polyethylene (10 g.; melt viscosity 9400 cp. at 150° C.) are physicaly blended and extruded at 205° C. and 150 rpm into 23° C. water and chopped into ¼-inch pellets. The grindability procedure of Example 1 is repeated and the resulting blend has a grindability rating of 23% as compared to 10% for the polyester without the blended polyethylene.

EXAMPLE 7

Pellets of poly(ethylene terephthalate) polyester modified with 30 mole percent adipic acid and 27 mole percent 1,4-butanediol (I.V. [inherent viscosity] 0.79; 142 g.) and high molecular weight polyethylene (melt index 6.4; 35.5 g.; density 0.917) are physically blended, dried overnight at 75° C. under vacuum, and melt blended in an extruder at 200° C. according to the procedure in Example 1. These pellets (10 g.) are cryogenically ground in a micromill and sieved through a 70 mesh screen. This blend has a grindability rating of 12%.

Similar results are obtained when high molecular weight, high density polyethylene (melt index 32.7, density 0.953) is used instead of low density polyethylene. This example shows that high molecular weight polyethylenes are not useful in increasing the grindability of the polyester.

EXAMPLE 8

Pellets of poly(hexamethylene terephthalate) modified with 10 mole percent isophthalic acid (95 g.; I.V. [inherent viscosity] 0.61; $T_m$ [melting point] 140° C.; $\Delta H_f$ [apparent heat of fusion] 8 calories per gram) and 5 g. of low density polyethylene (melt viscosity 9400 cp. at 150° C., $T_m$ [melting point] 100° C.) are physically blended and extruded at 205° C. and 150 rpm as a rod into 23° C. water and chopped into ¼-inch pellets. The grindability procedure of Example 1 is repeated and this polyester/polyethylene blend has a grindability rating of 29% as compared to 11% for the unblended polyester.

Similarly good results are achieved when poly(hexamethylene terephthalate) modified with 20 mole percent isophthalic acid (I.V. [inherent viscosity] 0.57; $T_m$ [melting point] 125° C.; $\Delta H_f$ 5 calories per gram) or modified with 35 mole percent isophthalic acid (I.V. [inherent viscosity] 0.44; $T_m$ [melting point] 140° C.; $\Delta H_f$ 2 calories per gram) are used instead of the poly(hexamethylene terephthalate) modified with 10 mole percent isophthalic acid.

EXAMPLE 9

Pellets of poly(tetramethylene terephthalate) modified with 50 mole percent isophthalic acid (90 g.; I.V. [inherent viscosity] 0.64; $T_m$ [melting point] 129° C. $\Delta H_f$ 2 calories per gram) and 10 g. of oxidized, low-viscosity, high-density polyethylene (acid No. 16; melt viscosity 160 cp. at 150° C.; $T_m$ [melting point] 116° C.) are physically blended and extruded at 180° C. and 150 rpm as a rod into chilled water (18° C.) and chopped into ¼-inch pellets. The grindability procedure of Example 1 is repeated and this polyester/polyethylene blend has a grindability rating of 35% as compared to 14% for the unblended copolyester.

Similarly good results are achieved when poly(tetramethylene terephthalate) modified with 40 mole percent isophthalic acid (I.V. [inherent viscosity] 0.97; $T_m$ [melting point] 140° C.) or modified with 60 mole percent isophthalic acid (I.V. [inherent viscosity] 0.81; $T_m$ [melting point] 139° C.) are used instead of poly(tetramethylene terephthalate) modified with 50 mole percent isophthalic acid.

EXAMPLE 10

Pellets of poly(1,4-cyclohexylenedimethylene isophthalate) modified with 40 mole percent terephthalic acid (I.V. [inherent viscosity] 0.49; $\Delta H_f$ 1 calorie per gram) 90 g.; and oxidized, low-viscosity, high-density polyethylene (acid No. 16; melt viscosity 160 cp. at 150° C.; 10 g.) are physically blended and extruded at 205° C. and 150 rpm into 23° C. water and chopped into ¼-inch pellets. These pellets (10 g.) are cryogenically ground in a micromill and sieved through a 70 mesh screen. The blend has a grindability rating of 35.0% (percentage of powder which will pass through a 70 mesh screen) as compared to 16.3% for the polyester without the blended polyethylene. This material is particularly suitable for powder coating use.

EXAMPLE 11

Pellets of a copolyester containing 100 mole percent terephthalic acid, 80 mole percent 1,6-hexanediol, and 20 mole percent 1,4-butanediol [90 g.; I.V. (inherent viscosity) 0.72; $T_m$ (melting point) 125° C.; $\Delta H_f$ 8 calories per gram] and 10 grams of oxidized low-viscosity high-density polyethylene (acid No. 16; melt viscosity 160 cp. at 150° C.; $T_m$ 116° C.) are physically blended and extruded at 200° C. and 150 rpm as a rod into 23° C. water and chopped into ¼-inch pellets. These pellets (10 grams) are cryogenically ground in a micromill and sieved through a 70-mesh screen. The blend has a grindability rating of 11% (percentage of powder which will pass through a 70 mesh screen) as compared to 5% for the polyester without the blended polyethylene. The grindability rating of the blend is further improved by heat treating the pellets in boiling water for 2 hours. After drying the pellets in a vacuum oven for 16 hours at 60° C., the pellets have a grindability rating of 17%.

The cryogenically-ground powder blend (less than 70 mesh) is applied to fusible interlining fabric by a random sprinking technique and fused under an ultraviolet lamp to provide a coating weight of 20 grams per square yard. Samples of the fusible interlining are bonded to polyester doubleknit fabric at 152° C./4.5 psi/15 second dwell time. The peel strength of the bond is 2.4 pounds per inch. Similarly good results are obtained when less than 70 mesh powder is applied to fusible interlining fabric from a powderpoint coater and the dots of the adhesive are fused by passing the fabric under a bank of quartz-infrared heaters.

EXAMPLE 12

Pellets of a copolyester containing 80 mole percent terephthalic acid, 20 mole percent isophthalic acid, 80 mole percent 1,6-hexanediol, and 20 mole percent 1,4-butanediol (90 grams; I.V. [inherent viscosity] 0.70; $T_m$ [melting point] 100° C.; $\Delta H_f$ 4 calories per gram) and low-viscosity high-density polyethylene (10 grams; melt viscosity 450 cp. at 125° C.) are physically blended and extruded at 200° C. and 150 rpm into 23° C. water and chopped into ¼-inch pellets. The grindability procedure of Example 11 is repeated and the resulting blend has a grindability rating of 22.8% (percentage of powder which will pass through a 70 mesh screen) as compared to 7% for the polyester without the blended polyethylene.

The cryogenically-ground powder blend (less than 70 mesh) is applied to fusible interlining fabric from a powderpoint coater and the dots of adhesive are fused by passing the fabric under a bank of quartz-infrared heaters. The adhesive coating weight is 18 g./yd.$^2$ Samples of this fusible interlining fabric are bonded to polyester doubleknit face fabric and also to polyester/wool blend face fabric at 130° C./4.5 psi/15 second dwell time. The peel strength of the bonds is 2.2 and 2.3 pounds per inch, respectively.

Similar improvements in grindability are achieved when 3%, 5%, 20%, and 30% concentration of the polyethylene are melt blended with the polyester.

EXAMPLE 13

Pellets of a copolyester containing 100 mole percent terephthalic acid, 95 mole percent 1,6-hexanediol, and 5 mole percent 1,4-butanediol (90 grams; I.V. [inherent viscosity] 0.78; $T_m$ [melting point] 140° C.; $\Delta H_f$ 8.5 calories per gram) and oxidized low-viscosity low-density polyethylene (10 grams; acid No. 15; melt viscosity 1200 cp. at 125° C.) are physically blended and extruded at 200° C. and 150 rpm into 23° C. water and chopped into ¼-inch pellets. The grindability procedure of Example 11 is repeated and the resulting blend has a grindability rating of 17% as compared to 6% for the polyester without the blended polyethylene.

EXAMPLE 14

A copolyester containing 100 mole percent terephthalic acid, 90 mole percent 1,6-hexanediol, and 10 mole percent 1,4-butanediol (90 grams; I.V. [inherent viscosity] 0.62; $T_m$ [melting point] 133° C.; $\Delta H_f$ 7.5 calories per gram) and low-viscosity low-density polyethylene (10 grams; melt viscosity 1800 cp. at 125° C.) are physically blended and extruded at 200° C. and 150 rpm into 23° C. water and chopped into ¼-inch pellets. The grindability procedure of Example 11 is repeated and the modified polyester/polyethylene blend has a grindability rating of 14% as compared to 5% for the polyester without the blended polyethylene.

EXAMPLE 15

Pellets of a copolyester containing 100 mole percent terephthalic acid, 70 mole percent 1,6-hexanediol, and 30 mole percent 1,4-butanediol (90 grams; I.V. [inherent viscosity] 0.81; $T_m$ [melting point] 132° C.; $\Delta H_f$ 6.5 calories per gram) and maleated low-viscosity low-density polyethylene (10 grams; saponification No. 5; melt viscosity 12000 cp. at 150° C.) are physically blended and extruded at 200° C. and 150 rpm into 23° C. water and chopped into ¼-inch pellets. The grindability procedure of Example 11 is repeated and the resulting blend has a grindability rating of 21% as compared to 7% for the polyester without the blended polyethylene.

EXAMPLE 16

Pellets of a copolyester containing 100 mole percent terephthalic acid, 58 mole percent 1,6-hexanediol, and 42 mole percent 1,4-butanediol (90 grams; I.V. [inherent viscosity] 0.74; $T_m$ [melting point] 140° C.; $\Delta H_f$ 8.5 calories per gram) and low-viscosity low-density polyethylene (10 grams; melt viscosity 9400 cp. at 150° C.) are physically blended and extruded at 200° C. and 150 rpm into 23° C. water and chopped into ¼-inch pellets. The grindability procedure of Example 11 is repeated and the resulting blend has a grindability rating of 17% as compared to 5% for the polyester without the blended polyethylene.

EXAMPLE 17

Pellets of a copolyester containing 80 mole percent terephthalic acid, 20 mole percent isophthalic acid, and 100 mole percent 1,6-hexanediol (90 grams; I.V. [inherent viscosity] 0.79; $T_m$ [melting point] 120° C.; $\Delta H_f$ 6.5 calories per gram) and oxidized low-viscosity high-density polyethylene (10 grams; acid No. 16; melt viscosity 160 cp. at 150° C.) are physically blended and extruded at 200° C. and 150 rpm into 23° C. water and chopped into ¼-inch pellets. The grindability procedure of Example 11 is repeated and the resulting blend has a grindability rating of 18% as compared to 6% for the polyester without the blended polyethylene.

EXAMPLE 18

Pellets of a copolyester containing 80 mole percent terephthalic acid, 20 mole percent isophthalic acid, 90 mole percent 1,6-hexanediol, and 10 mole percent 1,4-butanediol (90 grams; I.V. [inherent viscosity] 0.70; $T_m$ [melting point] 114° C.; $\Delta H_f$ 5.8 calories per gram) and low-density polyethylene (10 grams; melt viscosity 9400 cp. at 150° C., $T_m$ [melting point] 100° C.) are physically blended and extruded at 200° C. and 150 rpm as a rod into 23° C. water and chopped into ¼-inch pellets. The grindability procedure of Example 11 is repeated and this polyester/polyethylene blend has a grindability rating of 22% as compared to 7% for the unblended polyester.

EXAMPLE 19

Pellets of a copolyester containing 80 mole percent terephthalic acid, 20 mole percent isophthalic acid, 70 mole percent 1,6-hexanediol, and 30 mole percent 1,4-butanediol (90 grams; I.V. [inherent viscosity] 0.61; $T_m$ [melting point] 108° C.; $\Delta H_f$ 6 calories per gram) and 10 grams of oxidized low-viscosity high-density polyethylene (acid No. 16; melt viscosity 160 cp. at 150° C.; $T_m$ [melting point] 116° C.) are physically blended and extruded at 180° C. and 150 rpm as a rod into chilled water (18° C.) and chopped into ¼-inch pellets. The grindability procedure of Example 11 is repeated and this polyester/polyethylene blend has a grindability rating of 27% as compared to 7% for the unblended copolyester.

Similarly good results are achieved when a copolyester containing 90 mole percent terephthalic acid, 10 mole percent isophthalic acid, 80 mole percent 1,6-hexanediol, and 20 mole percent 1,4-butanediol ($T_m$ [melting point] 115° C.; $\Delta H_f$ 5.2) are used instead of the above-described copolyester.

EXAMPLE 20

Pellets of a copolyester containing 80 mole percent terephthalic acid, 20 mole percent isophthalic acid, 35 mole percent 1,6-hexanediol, and 65 mole percent 1,4-butanediol (90 grams; I.V. [inherent viscosity] 0.73; $T_m$ [melting point] 140° C.; $\Delta H_f$ 6.5 calories per gram) and oxidized low-viscosity high-density polyethylene (10 grams; acid No. 16; melt viscosity 160 cp. at 150° C.; $T_m$ [melting point] 116° C.) are physically blended and extruded at 180° C. and 150 rpm as a rod into chilled water and chopped into ¼-inch pellets. The grindability procedure of Example 11 is repeated and this copolyester/polyethylene blend has a grindability rating of 19% as compared to 6% for the unblended copolyester.

EXAMPLE 21

Pellets of a copolyester containing 70 mole percent terephthalic acid, 30 mole percent isophthalic acid, 90 mole percent 1,6-hexanediol, and 10 mole percent 1,4-butanediol (90 grams; I.V. [inherent viscosity] 0.75; $T_m$ [melting point] 97° C.; $\Delta H_f$ 3.1 calories per gram) and maleated low-viscosity low-density polyethylene (10 grams; saponification No. 5; melt viscosity 8000 cp. at 150° C.) are physically blended and extruded at 180° C. and 150 rpm into 23° C. water and chopped into ¼-inch pellets. The grindability procedure of Example 11 is repeated and the resulting blend has a grindability rating of 23% as compared to 7% for the copolyester without the blended polyethylene.

Similarly good results are obtained when a copolyester containing 60 mole percent terephthalic acid, 40 mole percent isoptalic acid, 90 mole percent 1,6-hexanediol, and 10 mole percent 1,4-butanediol are used instead of the above-described copolyester.

EXAMPLE 22

Pellets of a copolyester containing 95 mole percent terephthalic acid, 5 mole percent isophthalic acid, 75 mole percent 1,6-hexanediol, and 25 mole percent 1,4-butanediol (95 grams; I.V. [inherent viscosity] 0.70; $T_m$ 125° C.; $\Delta H_f$ 8.8 calories per gram) and oxidized low-viscosity high-density polyethylene (5 grams; acid No. 16; melt viscosity 160 cp. at 150° C.) are physically blended and extruded at 205° C. and 150 rpm into 23° C. water and chopped into ¼-inch pellets. These pellets are cryogenically ground in a micromill and sieved through a 70 mesh screen. The blend has a grindability rating of 16% as compared to 5% for the polyester without the blended polyethylene.

EXAMPLE 23

Pellets of a copolyester containing 100 mole percent terephthalic acid, 80 mole percent 1,6-hexanediol, and 20 mole percent 1,4-butanediol (90 grams; I.V. [inherent viscosity] 0.72; $T_m$ [melting point] 125° C.; $\Delta H_f$ 8 calories per gram) and high-molecular-weight low-density polyethylene (10 grams; melt index 6.4; density 0.917) are physically blended and extruded at 200° C. and 150 rpm as a rod into 23° C. water and chopped into ¼-inch pellets. The grindability procedure of Example 11 is repeated and this copolyester/polyethylene blend has a grindability rating of 5% as compared to 5% for the copolyester without the blended polyethylene. This example demonstrates that high-molecular-weight low-density polyethylene is not useful in increasing the grindability of the copolyester.

Similar results are obtained when high-molecular-weight high-density polyethylene (melt index 32.7; density 0.953) is used instead of the high-molecular-weight low-density polyethylene. This also demonstrates that high-molecular-weight high-density polyethylene is not useful in increasing the grindability of the copolyester.

The invention has been described in detail with particular reference to certain preferred embodiments thereof, but it will be understood that variations and modifications can be effected within the spirit and scope of the invention.

We claim:

1. An improved polyester suitable for powder adhesives and powder coating materials comprising an intimate melt blend of (A) a semicrystalline polyester having an inherent viscosity ranging from about 0.4 to 1.2, a melting point of about 80°–155° C. and an apparent heat of fusion of $\leq 10$ calories per gram selected from the group consisting of copolyester containing from 100 to 60 mole percent terephthalic acid, 0 to 40 mole percent isophthalic acid, 100 to 35 mole percent 1,6-hexanediol and 0 to 65 mole percent 1,4-butanediol; and (B) a low molecular weight polyethylene having a melt viscosity ranging from about 50 to 30,000 centipoises at 150° C., a density at 25° C. of about 0.90 to 0.98 and an acid number of about 0–80; wherein said low molecular weight polyethylene is present in the blend in an amount of from about 3 to about 30% by weight.

2. The polyester powder of claim 1, wherein the copolyester contains 100 to 65 mole percent terephthalic acid, 0 to 35 mole percent isophthalic acid, 95 to 40 mole percent 1,6-hexanediol and 5 to 60 mole percent 1,4-butanediol.

3. The polyester powder of claim 1, wherein the copolyester contains 100 mole percent terephthalic acid, 80 mole percent 1,6-hexanediol and 20 mole percent 1,4-butanediol.

4. The polyester powder of claim 1, wherein the copolyester contains 80 mole percent terephthalic acid, 20 mole percent isophthalic acid, 80 mole percent 1,6-hexanediol and 20 mole percent 1,4-butanediol.

5. The polyester powder of claim 1, wherein the copolyester contains 100 mole percent terephthalic acid, 58 mole percent 1,6-hexanediol and 42 mole percent 1,4-butanediol.

6. The polyester powder of claim 1, wherein the copolyester contains 80 mole percent terephthalic acid, 20 mole percent isophthalic acid, 70 mole percent 1,6-hexanediol and 30 mole percent 1,4-butanediol.

7. The polyester powder of claim 1, wherein the copolyester contains 80 mole percent terephthalic acid, 20 mole percent isophthalic acid, 35 mole percent, 1,6-hexanediol and 65 mole percent 1,4-butanediol.

8. The polyester powder of claim 1, wherein the copolyester contains 90 mole percent terephthalic acid, 10 mole percent isophthalic acid, 80 mole percent 1,6-hexanediol and 20 mole percent 1,4-butanediol.

* * * * *